Jan. 27, 1970 — D. C. WILLIAMS — 3,491,518
SOLID-GAS SEPARATING MEANS
Filed Sept. 15, 1966
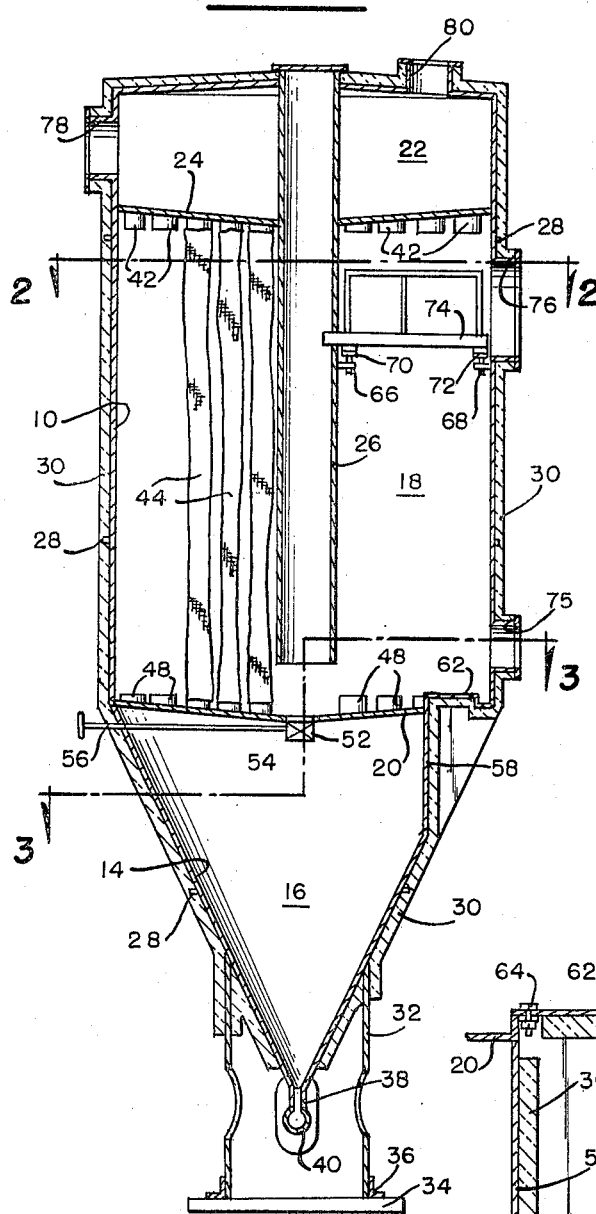
FIG. 1.
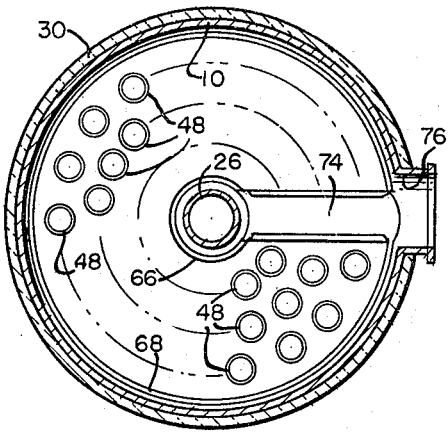
FIG. 2.
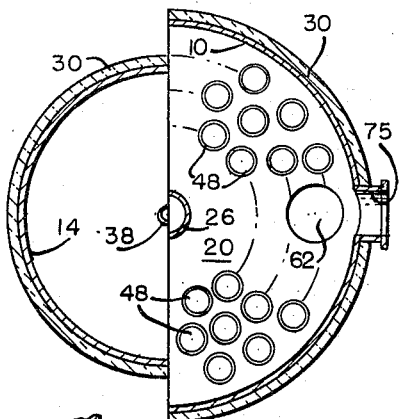
FIG. 3.
FIG. 6.
INVENTOR
David C. Williams
BY *Walter H. Schneider*
ATTORNEY Jan. 27, 1970        D. C. WILLIAMS        3,491,518
SOLID-GAS SEPARATING MEANS
Filed Sept. 15, 1966        4 Sheets-Sheet 2
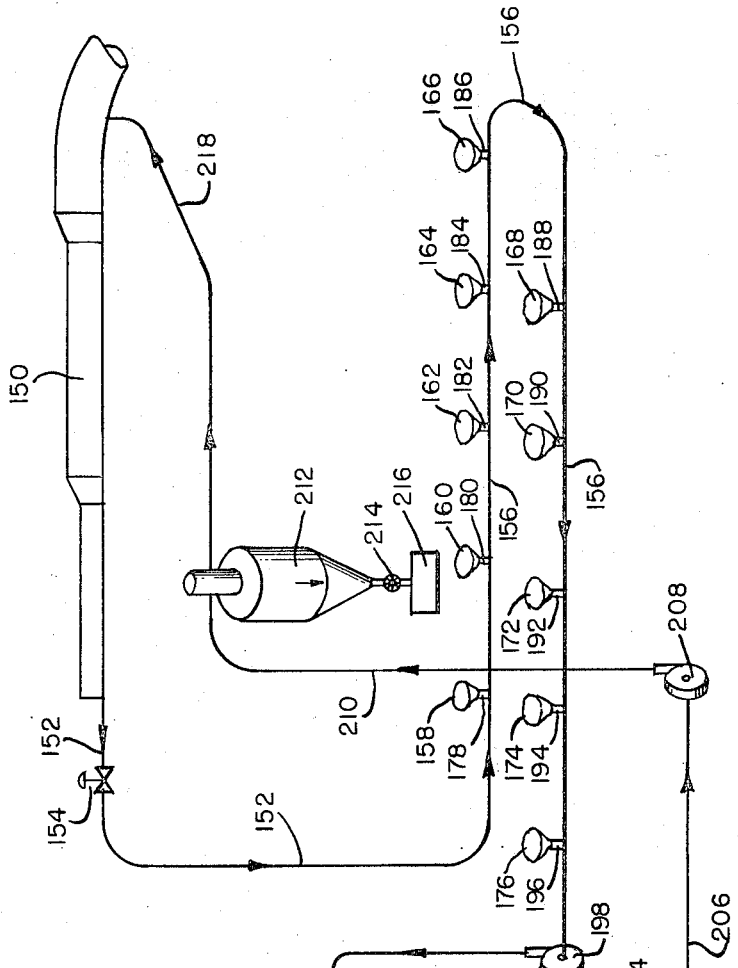
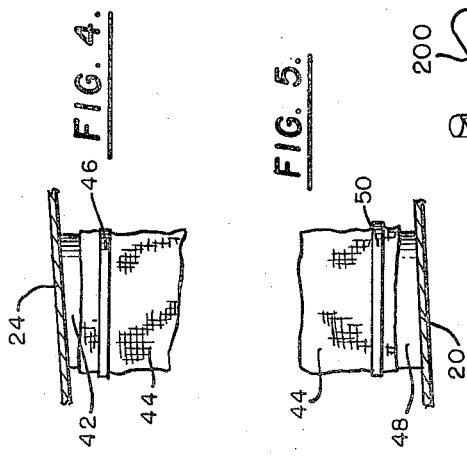
INVENTOR
David C. Williams
BY Walter H. Schneider
ATTORNEY Jan. 27, 1970   D. C. WILLIAMS   3,491,518
SOLID-GAS SEPARATING MEANS
Filed Sept. 15, 1966   4 Sheets-Sheet 3
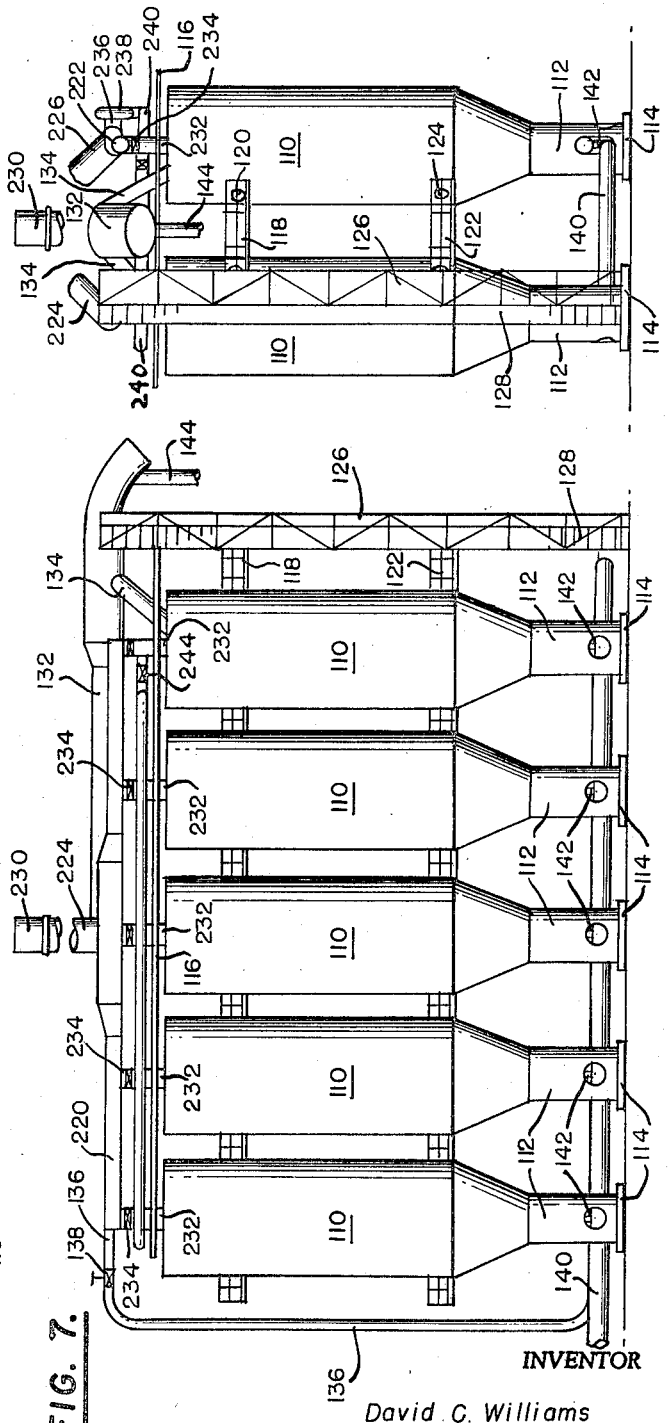
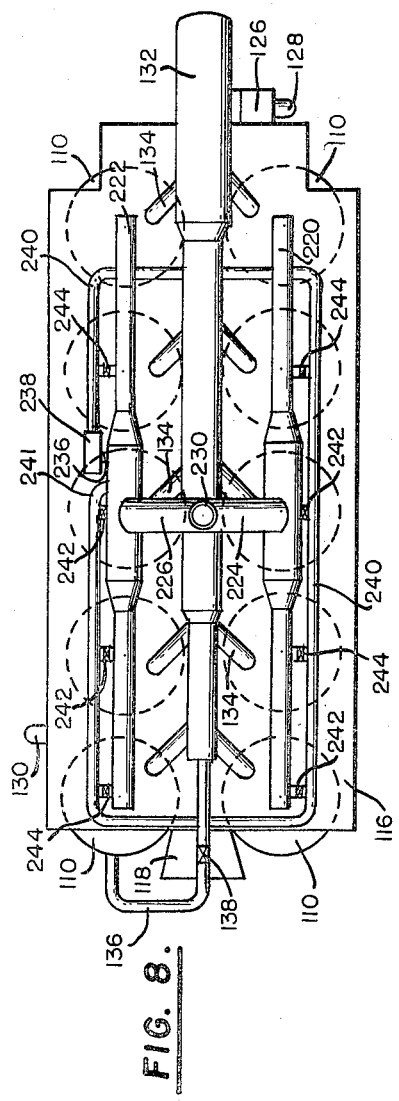
INVENTOR
David C. Williams
BY Walter H. Schneider
ATTORNEY INVENTOR
David C. Williams
BY Walter H. Schneider
ATTORNEY United States Patent Office 3,491,518
Patented Jan. 27, 1970

3,491,518
SOLID-GAS SEPARATING MEANS
David C. Williams, Houston, Tex., assignor to Ashland
Oil & Refining Company, Houston, Tex., a corporation
of Kentucky
Filed Sept. 15, 1966, Ser. No. 579,567
Int. Cl. B01d 46/02
U.S. Cl. 55—284          16 Claims

ABSTRACT OF THE DISCLOSURE

A novel bag-type filter system and filter for use therein, including a plurality of cylindrical filter units having their axes disposed in a vertical plane, a solids-gas inlet manifold of diminishing cross section toward the last of the filter units and connected in parallel to each of the filter units, a solids discharge manifold of increasing cross section toward the last of the filter units and connected in parallel with the filter units, orifice type solids outlets connected to said outlet manifold and having progressively smaller diameters from the first to the last of the filter units, a valved line for transporting a portion of the solids-gas feed to the solids outlet manifold to act as a fluidizing transport medium for the solids, a clean gas manifold of generally increasing cross section toward a single outlet to the atmosphere, a repressure gas line forming a complete loop from the clean gas manifold and thence back to the clean gas manifold with appropriate branch lines to each of the filter units, each of the filter units including an upper and a lower plate mounted in the cylindrical unit across the entire cross section thereof and adjacent the bottom and the top, respectively, of the unit, the space above the top plate forming a deceleration section for receiving solids-gas feed, the central space between the top plate and the bottom plate forming a filter section and a frusto-conical lower end of the cylindrical body with its base above its apex forming a solids collecting section below the bottom plate, the top and bottom plates also having apertures formed therethrough terminating in flanged openings directed toward the center of the unit, open-ended cylindrical bags mounted on opposing ones of the flanged openings, a clean gas discharge pipe having an open lower end spaced above the lower plate and extending upwardly along the axis of the unit to the clean gas discharge manifold, a guide track around the entire periphery of the clean gas discharge pipe and a second guide track on the same horizontal plane as the first around the entire inner surface of the cylindrical unit, and a wheeled platform mounted on the tracks and adapted to move around the central clean gas pipe in the annular space between the clean gas pipe and the outer wall of the unit.

---

The present invention relates to a novel bag-type filter means for separating solids from a solids-laden gas. More specifically, the present invention relates to a novel bag-type filter means for separating carbon black particles from a carbon black-laden smoke.

In the art of producing carbon black by pyrolysis a hot gaseous effluent or smoke at a temperature of about 1200° F. to 3000° F. emanates from the pyrolysis reactor. Generally, this carbon black-laden smoke is cooled to a temperature in the order of about 400° F. to 600° F. by quenching with water in the reactor and thereafter cooling in an external cooler. Generally the quenching operation consists of contacting the effluent near the exit of the reactor with a spray of water. The quenched effluent is then conveyed to the cooler and thereafter to a recovery system, wherein the carbon black is separated from the smoke. In order to recover the greatest amount of carbon black from the smoke and, additionally, in order to obviate creating a nuisance by discharging carbon black-containing gas to the atmosphere, it is customary to filter the smoke through cloth or fabric bag-type filters. By and large the fabric bag-type filters used in the recovery of carbon black are glass cloth bags which are comparatively resistant to high temperatures and chemical attack. The latter is an important consideration since there are significant amounts of acidic components in carbon black smoke, particularly when employing feedstocks of petroleum origin. However, one prominent disadvantage of glass cloth bags is that they are subject to wear and deterioration by mechanical stress when subjected to conventional shaking operations which are normally practiced to maintain the bag filters clean and free of carbon black deposits adhering to the surface thereof.

The usual carbon black filter bag is closed at its top and this closed top is generally attached to the bag shaking means. The open lower end of the suspended bag is attached to tubular nipple or flange mounted over an aperture in a cell plate spanning the lower portion of the filter unit. The carbon black-laden smoke is introduced below the cell plate and passes upwardly to the interior of a plurality of such filter bags. Clarified gas or smoke passes through the bags to the exterior thereof in a filtering zone and thence to a clarified gas outlet. Most of the carbon black is retained on the surface of the bag. In a cleaning, or what is termed conventionally as a "repressurizing," cycle, clarified gas obtained from one or more filter zones, which are in their filtering cycle, is introduced into the filter zone on the clarified gas side of the filter bags. The reverse flow of repressuring gas through the bags, coupled with the bag-shaking action, effectively cleans the bags of the accumulated layer of carbon black. Most of the carbon black drops into the bottom hopper of the filter unit and is suitably retrieved therefrom.

It has normally been proposed to discharge the carbon black from the filter unit hopper by means of a positive gas lock valve, such as a star valve or screw conveyor, in order to prevent passage of any significant amount of gas into the solids transport or recovery system. The solids transport system may include a screw conveyor or other appropriate transport means. It has heretofore been suggested that a part of the repressure gas be used as a transport medium for the separated carbon black. However, it is obvious that such transport gases are subject to serious fluctuations in pressure even when all of the repressure gas from one of a multiplicity of filter units is utilized.

Where a multiplicity of parallel-connected filter units is employed there is a problem of maintaining an even and continuous flow of carbon black-laden smoke to the filter units and also in maintaining an even and continuous flow of separated carbon black from the units.

Where a multiplicity of filter cells are utilized in the separation of carbon black from carbon black-laden smoke, there are also serious problems of corrosion which occur in the repressuring system. Since only one or less than all of the units uundergoes repressuring at any given given time, it is obvious that the manifold line supplying repressuring gas to the system will have intermittent flow therethrough and flow at one end in the manifold may be stagnant for considerable periods of time. As a result, this portion of the manifold cools, condensation occurs in the manifold and, subsequently, corrosion of the system occurs.

It is therefore an object of the present invention to provide an improved bag-type filter means. A further object of the present invention is to provide an improved bag-type filter means for removing carbon black from a carbon black-laden smoke. Yet another object of the present invention is to provide an improved bag-type filter for removing solids from a solids-laden gas, which includes a novel separated solids discharge means. Another and further object of the present invention is to provide a multi-unit filter system having a novel transport system for separated solids. A still further object of the present invention is to provide an improved multi-unit filter system having a novel closed loop repressure system. Another and further object of the present invention is to provide an improved multi-unit filter system having a novel transport system for separated solids and a novel closed loop repressure system. Yet another object of the present invention is to provide an improved multi-unit filter system having a novel flow system through a plurality of tubular open ended bags, a novel separated solids discharge system, a novel separated solids transport system and a novel repressuring system. These and other objects and advantages of the present invention will be apparent from the following detailed description when read in conjunction with the drawings, wherein:

FIGURE 1 is a front elevational view partially in section, of a filter unit of the present invention;

FIGURE 2 is a cross-sectional view taken along the line 2—2 of FIGURE 1;

FIGURE 3 is a cross-sectional view taken along the line 3—3 of FIGURE 1;

FIGURE 4 is an enlarged, detailed view, partially in section, of the means for mounting the upper portion of a bag in the filter of FIGURE 1;

FIGURE 5 is an enlarged detailed view, partially in section, of the means for mounting the lower end of a bag in the filter of FIGURE 1;

FIGURE 6 is an enlarged detailed view, partially in section, showing the means of access for inserting bags through the lower portion of the filter zone of the filter of FIGURE 1;

FIGURE 7 is a side elevational view of a multi-unit filter system;

FIGURE 8 is a top view of the filter system of FIGURE 7;

FIGURE 9 is an end elevational view of the system of FIGURE 7;

FIGURE 10 is an isometric, schematic drawing of the solids transport system.

Figure 11:
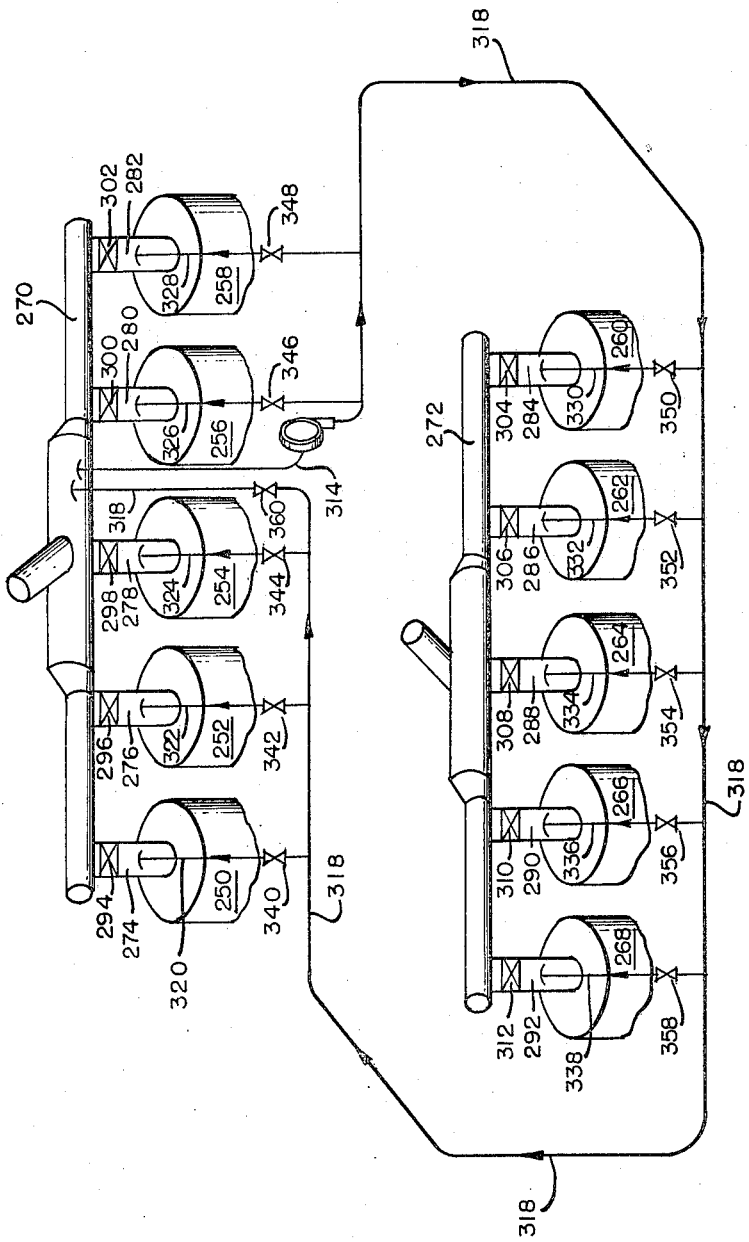
FIGURE 11 is an isometric, schematic drawing of the repressure system.

In accordance with the present invention, it has been surprisingly discovered that solids may be effectively separated from solids-laden gas in a novel down-flow filter having tubular open ended bags; and that, contrary to the prior art, the separated solids can be continuously discharged from the filter along with a small portion of the solids-laden gas. It has also been surprisingly discovered that a portion of the solids-laden gas discharged along with separated solids can be used as a transport medium along with a part of the solids-laden gas taken from the gas inlet to the filter system. A further surprising discovery of the present invention is that a filter system can be provided with a closed loop repressuring system and thereby eliminate, to a great extent, uneven flow and corrosion in the repressure system. The following detailed description taken in conjunction with the drawings will illustrate these novel features.

FIGURES 1 through 6 of the drawings illustrate the details of construction of a preferred filter unit in accordance with the present invention.

In accordance with these drawings, the main body of the filter unit is comprised of a cylindrical steel shell 10, terminating at its upper end in slightly inclined top closure 12 and at its lower end in a frusto-conical member whose base is above its apex or hopper 14. The lower hopper zone 16 is adapted to receive separated solids and is separated from the central filter zone 18 by downwardly inclined lower cell plate 20. In like manner, central filter zone 18 is separated from upper deceleration and distribution zone 22 by upper cell plate 24, which is also inclined downwardly toward its center. Passing along the central axis of filter zone 18 from a point just above lower cell plate 20 and thence through distribution zone 22 and out through top closure 12 of the unit is a clarified gas outlet duct 26. Circling the exterior of shell 10 and hopper 14 at spaced vertical points are insulation support ribs 28. These support ribs 28 support a layer of insulation 30, which surrounds the entire unit. Inasmuch as any metal structure which comes in contact with the filter unit must be well insulated beyond the point of contact and also must be periodically sand blasted and painted, the insulation and maintenance of such support structures is a considerable problem. Accordingly, the present filtering unit has no superstructure supporting the unit but is almost totally supported by cylindrical skirt 32. Skirt 32 is appropriately welded to the exterior of cone 14 at a point approximately midway between the top and bottom of the cone. Skirt 32 is attached at its bottom end to a base 34 by means of a rolled angle 36 welded to the skirt. Because of this novel support structure and means of supporting the filtering unit, it is possible to attach all necessary platforms and the like to the shell itself by means of lugs extending from the exterior of the unit. Located at the outlet of cone 114 is an orifice-type solids discharge means 38. Orifice 38, as will be pointed out in more detail hereinafter, is open at all times but is sized in a manner to permit discharge of solids while at the same time providing a continuous leak of gas to horizontally-disposed solids transport duct 40. Upper cell plate 24 has formed therein a plurality of circular apertures. These circular apertures are extended downwardly by means of short tubular thimbles or bag-connector means 42. Thimbles 42 vary in length so that their lower ends terminate at the same vertical plane. Thus, thimbles 42 form an upper terminus for filter bags 44. Filter bags 44 are cylindrical, tubular bags having both ends open. The upper ends of bags 44 are slipped over upper thimbles 42 and held in place by banding 46. Bags 44 terminate at their lower ends of lower thimbles 48 which extend upwardly from a plurality of circular apertures formed in lower cell plate 20. Thimbles 48 are also of different lengths so that their ends terminate at a single horizontal plane. Bags 44 have their lower ends attached to thimbles 48 by means of appropriate banding 50. Lower cell plate 20 also has formed therein a central opening which is extended by downwardly projecting tube 52. Mounted in tube 52 is floor cleanup valve 54, whose valve handle 56 extends through hopper zone 16 to the exterior thereof. Valve 54 is, of course opened for the purpose of cleaning up the upper surface of lower cell plate 20. For such cleanup operations and for the insertion of bags in filter chamber 18 a semi-cylindrical, vertically-disposed depression 58 is formed in the outer surface and adjacent the top of cone 14 and extends upwardly through lower cell plate 20. The semi-cylindrical depression terminates at its upper end in an annular flange or step 60 above the level of lower cell plate 20. Normally, the opening formed by semi-cylindrical depression 58 is closed by plate 62 held to step 60 by means of bolts 64. A man-way 75 can also be provided for access to the cell. Provision is also made for the servicing of bags adjacent the top of filter zone 18. For this purpose, track 66 is formed annularly about outlet duct 26. At the same horizontal plane, track 68 is formed about the interior of shell 10. Mounted on tracks 66 and 68 through rollers or wheels 70 and 72, respectively, is bag service platform 74. Bag service platform 74 serves as a platform for a man to attach or remove the upper ends of bags 44 on or from thimbles 42. Access to this platform and an opening for removing the platform, if desired, is provided through man-way 76 through the side of shell 10. For like access to the upper surface of upper cell plate 24, an appropriate man-way 78 passes through shell 10 at an appropriate point along the height of the shell. A solids-laden gas inlet connection 80 is formed in top closure 12 for the introduction of solids-laden gas to deceleration and distribution zone 22.

FIGURES 7, 8, 9 and 10 of the drawings illustrate a multi-unit filter system in accordance with the present invention; including, a novel separated solids transport system.

In accordance with the drawings, the system, as shown, comprises ten filter units 110 arranged in two parallel rows. By way of example, to show the proportions and arrangement, a typical cell 110 will be about 15 feet in diameter, each pair of cells will be spaced on center lines about 17 feet apart and the center lines through the two rows will be spaced about 19½ feet from one another. The cells are substantially completely supported by individual skirt units 112 into which a portion of the cone or hopper section of the cell 110 passes and to which the hopper portion is welded. Skirts 112 are in turn attached to base elements 114. Extending across the top of the entire system of filters 110 is a valve service platform 116. Lower down the filters 110 and attached to the interior sides of the units is an upper cell service platform 118 which provides access to the upper portion of the filter unit for the removal and attachment of the upper ends of filter bags. Such access is provided through man-ways 120. Adjacent the lower end of filter units 110 and attached to the interior sides of the units is lower cell plate service platform 122 which permits access to the lower portion of the filter through man holes 124, for purposes of attaching and detaching the lower ends of the bag elements. Extending from ground level to valve service platform 116 is man-lift 126. Appropriate caged ladders 128 and 130 also provide access to platforms 116, 118 and 122.

Extending between the rows of filters 110 above valve service platform 116 is solids-laden gas inlet manifold or header 132 for the introduction to the filter units of solids-laden gas. Such introduction is provided by side branches 134 which extend from manifold 132 downwardly into filter units 110. Manifold 132 forms a portion of the novel separated solids transport system of the present invention. It is also to be noted that manifold 132 is of diminishing cross-section from its inlet end to its terminus at the fifth pair of filter units. For example, the drawings show a stepped design wherein the bottom of the manifold is straight, the initial section is about 60 inches in diameter adjacent the first two filters. The diameter then diminishes to about 54 inches adjacent the second and third pair of filters and, finally, diminishes to a 36-inch diameter adjacent the fourth and fifth pairs of filters. This diminishing cross-section can also be continuous rather than stepped. In any event, the diminishing cross-section of header 132 accommodates the decrease in volume of solids-laden gas caused by the withdrawal by the filters and provides a constant and even flow through the manifold with no low or high pressure spots at any point. Obviously, with such continuous, even flow, filtering will be much more effective and consistent from one unit to another. Extending from the terminal end of inlet manifold 132, adjacent the fifth pair of filters 110 is withdrawal line 136. Withdrawal line 136 provides a continuous, small flow of solids-laden gas from inlet manifold 132 to act as a transport gas stream for separated solids, as hereinafter pointed out. Withdrawal line 136 is provided with valve 138 adapted to adjust the amount of gas withdrawn. Withdrawal line 136 passes to the end of solids transport manifold 140 adjacent the rearmost one of the fifth pair of filter units 110. Transport manifold 140 passes down the rearward row of filters 110 and then loops back below the front row of filter units 110 and is connected to and in open communication with the solids discharge means 142 of each of filter units 110. Transport manifold 140 then passes to appropriate apparatus (not shown) for further processing of the solids. In the preferred embodiment of the present invention transport manifold 140 gradually increases in diameter as it passes from the first to the last filter unit 110 to accommodate the solids plus gas added to the manifold by each successive unit. In the exemplified system it will initially be the same size as line 136, that is, 8 inches in diameter, adjacent the rearward filter of the fifth row and then increase in diameter to about 15 inches adjacent the solids discharge means of the forward filter of the fifth row. Thus, an even, continuous flow of solids through the transport manifold 140 can be provided with no hang-up of solids, no low or high pressure spots and dead spots in the manifold. Also, in the preferred embodiment, the solids discharge means 142 of filter units 110 are orifices which provide a continuous leakage of hot gas into transport manifold 140. Orifices 142 are of decreasing size from the rearward one of the fifth pair of filter units 110 to the forward one of the fifth pair of filter units 110. Accordingly, the orifices provide a portion of the gas necessary to convey solids in transport manifold 140. For example, about half of the transport gas may be supplied by withdrawal line 136, while the other half is supplied from the filter units 110 through orifices 142 along with the discharge of the solids through the orifices. It is also obvious that by sizing the orifices as indicated the flow through transport manifold 140 will be continuous and constant. After solids-laden gas from transport manifold 140 has passed through appropriate collection and processing equipment, the gas passes back to inlet manifold 132 by means of recycle line 144. Thus, a closed loop system may be provided. Recycle line 144 will normally be the same size as the terminal end of transport manifold 114, or specifically, about 15 inches in diameter.

FIGURE 10 of the drawings is an isometric, schematic drawing of the novel closed loop solids transport system for conveying solids from the solids discharge means of a plurality of filter units.

According to the drawing, solids-laden gas is introduced to the system through inlet duct 150. Inlet 150 is of successively smaller diameter from its inlet to its terminal end. By way of specific example, if a series of ten filter units are to be supplied with solids-laden gas and each of these units is 15 feet in diameter the initial cross-section of the inlet duct 150 should be about 60 inches until it passes the first pair of filters. Duct 150 should then reduce to about 54 inches in diameter as it passes the second and third pairs of filters and, finally reduce the about 36 inches in diameter as it passes the fourth and fifth pairs of filters. From the terminal end of inlet duct 150 solids-laden gas withdrawal line 152 takes a portion of the gas from duct 150, passes it through control valve 154, which is adapted to adjust the volume of gas passing through line 152, and thence to solids transport line 156 which passes beneath and in open communication with the filter units. More specifically, transport line 156 first passes filter unit 158, which for illustrative purposes is the rearward one of the fifth pair, 160, which is the rearward filter of the fourth pair, 162, representing the rearward filter of the third pair, 164, the rearward one of the second pair, 166, the rearward one of the first pair, 168, the forward or front one of the first pair, 170, the front one of the second pair, 172, the front one of the third pair, 174, the front one of the fourth pair, and 176, the front one of the fifth pair. Transport line 156 is preferably of continuously increasing cross-section or of stepped cross-section as it passes from filter 158 to filter 176. Taking the specific example previously discussed, withdrawal line 152 will be about 8 inches in diameter and line 156 will have the following diameters: 8.7 inches between 158 and 160; 9.6 between 160 and 162; 10.4 between 162 and 164; 11.1 between 164 and 166; 11.9 between 166 and 168; 12.55 between 168 and 170; 13.15 between 170 and 172; 13.8 between 172 and 174; 14.4 between 174 and 176 and 15 beyond 176. Filters 158 through 168 have outlet means 178, 180, 182, 184, 186, 188, 190, 192, 194, and 196, respectively. In the preferred embodiment of the present invention, a portion of the transport gas is continuously supplied through outlet means 178 through 196. For this purpose, outlet means 178 to 196 are orifice means of gradually decreasing diameter. In other words, the diameter of the orifice 178 is largest while the smallest diameter orifice is 196 and orifices 180 through 194 are intermediate these two sizes. For the system exampified suitable orifice diameters will be 3.25, 3.10, 2.96, 2.78, 2.62, 2.44, 224, 2.02, 1.78, 1.5 inches, respectively Solids and transport gas from transport line 156 pass through blower 198 to supply line 200 and thence to cyclone separator 202. In cyclone separator 202 the solids are separated from the transport gas and the solids are discharged from the bottom of cyclone 202 to grinders 204. Grinders 204 then transmit the separated solids to supply line 206 where the solids are again entrained in transport gas. Transport was for supply line 206 passes from cyclone 202 and transports the ground solids to blower 208. Blower 208 transmits the transport gas and solids through line 210 to a second cyclone separator 212. Cyclone separator 212 effects the final separation of solids from transport gas. The solids are discharged through a positive, gas lock valve, such as a star valve 214, to a loose solids surge tank 216. The separated transport gas is then discharged to line 218 from whence it is returned to inlet duct 150.

FIGURES 7, 8, 9 and 11 illustrated a multi-unit filter system in accordance with the present invention; including a, novel closed loop repressure system for a plurality of bag-type filters.

Clarified gas manifolds 220 and 222 are mounted above the front and rear rows of filter units 110, respectively. In the preferred embodiment manifolds 220 and 222 are of varying or stepped cross-section, as shown in the drawings. If, for example, the filters 110 are 15 feet in diameter and there are ten units, as shown, the manifolds are preferably about 48 inches in diameter where they serve the third or middle pair of filters and about 30 inches in diameter on either end where they serve the first and second and the fourth and fifth pairs, respectively. From the top of manifolds 220 and 222 branch ducts 224 and 226, respectively, connect the manifolds to a common discharge stack 228. At the top of discharge stack 228 is mounted a conventional burner 230, which further clarifies the exhaust gases before discharging the same to the atmosphere. Exhaust gas from filters 110 discharges through standpipes 232 which are connected at their lower ends to the output means of filters 110 and at the upper ends to manifolds 220 and 222, respectively. Mounted in the upper portion of each standpipe 232 is exhaust or clarified gas outlet valve 234 which is opened and closed for purposes of repressuring filter units 110. Leading from one of manifolds 220 or 222, in this case 222, is duct 236. Duct 236 withdraws a portion of the clarified gas from manifold 222 and feeds it to repressure blower 238. Repressure blower 238 discharges into looped repressure manifold 240. Manifold 240 forms a complete loop passing each of the standpipes 232 of filters 110 and then returns to manifold 222 and is controlled by valve 241. From loop 240 branch lines 242 pass to each standpipe 232 just below the valves 234. Each of the branch lines 242 also has mounted therein a repressure valve 244.

FIGURE 11 of the drawings shows a continuous-flow, closed loop repressure system for a plurality of carbon black, bag-type filters.

In accordance with FIGURE 11, two parallel rows of five filters each are shown. These filters are designated 250, 252, 254, 256, 258, 260, 262, 264, 266 and 268, respectively. Mounted above the rearmost row of filters 250 through 258 is a common header or manifold 270. A similar header or manifold 272 is disposed above the front row of filters 260 through 268. Clarified gas outlet manifolds 270 and 272 discharge into a common waste gas stack not shown. Leading from the clarified gas outlets of filters 250 through 268 are clarified gas standpipes 274, 276, 278, 280, 282, 284, 286, 288, 290 and 292, respectively. Mounted in standpipes 274 through 292 and adapted to open or close the standpipes for repressuring purposes are clarified gas discharge valves 294, 296, 298, 300, 302, 304, 306, 308, 310 and 312, respectively. Leading from either manifold 270 or 272, in the illustrated case 270, is clarified gas withdrawal line 314. Line 314 withdraws a portion of the clarified gas from manifold 270 by means of repressure blower 316. Repressure blower 316 discharges the clarified gas to loop repressure line or manifold 318. Looped line 318 passes the standpipes 274 through 292 of each of the filters and then returns to the same manifold 270. Leading from looped line 318 are repressuring branch lines 320, 322, 324, 326, 328, 330, 332, 334, 336, and 338. Mounted in each of branch lines 320 through 338 are repressure valves 340, 342, 344, 346, 348, 350, 352, 354, 356 and 358.

In operation, the continuous flow repressure system described above prevents condensation from forming within the repressure manifold and the subsequent corrosion of the manifold. Normally, a repressure system includes a manifold with a number of branch lines leading from the manifold to the filters. Since each filter is repressured individually and in series, flow through the manifold is intermittent. In addition, flow to one end of the manifold may be stagnant for considerable periods of time. Under these stagnant conditions condensation occurs in the manifold. In the present instance blower 316 continuously withdraws clarified hot gas from outlet manifold 270 and circulates this gas past all of the filter units and back to manifold 270. This therefore provides a continuous flow through the manifold at all times during the operation of the filter units. As each of the repressure valves opens valve 360 in looped line 318 closes at least partially.

To give a typical example of the operation of a filter system, built in accordance with the present invention, a carbon black-laden smoke, produced by a plurality of furnace-type reactors designed and operating to produce ISAF black at a rate of about 69,900 cubic feet per minute at a temperature of 450° F. is utilized as a feed to the filter system. This smoke will introduce carbon black to the system at a rate of about 102 lbs. per minute and gas to carbon black ratio of about 0.01465 lb. per cubic foot will exist. The minimum smoke velocity would be about 3000 feet per minute. Such a volume of carbon black-laden smoke can be produced by a battery of about six pyrolytic reactors. Under these conditions, the minimum velocity in the solids transport manifold would be about 4200 feet per minute. The gas to carbon black ratio in the transport system would be about 50 cubic feet of gas per pound of carbon black. The filter unit itself would have a filter cloth area of about 58,200 square feet actually in service and about 64,800 square feet total if a battery of ten units is utilized with one unit on repressure at any given time. Accordingly, for the ten units, 6,480 square feet of bag area would be required per filter unit and if bags 30 feet long and 11½ inches in diameter are used, there would need to be 72 bags per cell. The rate of gas passage per filter cell would be about 7,780 cubic feet per minute and the rate of carbon black passage per cell about 11.3 lbs. per minute. A ten-unit filter system having one unit on repressure at all times and nine units on the filter cycle and operating on the above-mentioned volumes of carbon black laden smoke can conveniently be operated on a time cycle of about 4 minutes or 240 seconds. Of this time cycle about 24 seconds would be consumed in a repressuring operation leaving about 216 seconds for the filter portion of the cycle. For example, in the repressuring of any one of the units, the first four seconds would be consumed in closing the outlet valve in the clarified gas discharge means and during this same period plus an additional two seconds of the cycle the repressure valve would be closed. From the sixth to the eighth second the repressure valve would be opening.

From the eighth to the eighteenth second the repressure valve would be open and the clarified gas outlet valve closed. Thereafter, from the eighteenth to the twentieth second the repressure valve would be closing and from the twentieth to the twenty-fourth second the clarified gas outlet valve would be opening.

I claim:

1. Bag-type filter means for separating solids from a solids-laden gas; comprising, a generally cylindrical outer shell its cylindrical axis extending vertically and having a top closure and terminating at its lower end in a frusto-conical member whose base is above its apex; a lower plate horizontally disposed across the interior of said shell adjacent the top of said frusto-conical member and, with said frusto-conical member forming a solids-collecting zone below said plate and said plate forming the bottom of a filter zone above said plate; an upper plate horizontally-disposed across the interior of said shell adjacent the top thereof and closing the top of said filter zone and with said top closure forming a deceleration zone above said plate; said lower plate having formed therethrough a plurality of apertures and having formed on its upper surface and associated with each of said apertures first connector means adapted to connect one end of a tubular filter bag to said plate in open communication with said aperture; said upper plate having formed therethrough a plurality of apertures and having formed on its lower surface and associated with each of said apertures second connector means adapted to connect the opposite end of said tubular filter bag to said upper plate in open communication with said aperture; each of said apertures in said upper plate being aligned with a complementary aperture in said lower plate; tubular porous filter bags removably connected to complementary ones of said first and said second connector means to provide open channels therethrough from said deceleration chamber to said solids-collecting zone; means for introducing solids-laden gas to said deceleration zone; means for discharging separated solids from said solids-collecting zone; and means for discharging clarified gas from the clarified gas side of said filter bags in said filter zone located on said axis of said cylindrical outer shell; said shell and said clarified gas outlet means defining an annular space therebetween; a first track substantially circumscribing the outer periphery of said clarified gas outlet means, at a predetermined distance below the upper plate; a second track at the same horizontal plane as the first track substantially circumscribing the inner periphery of said shell; and an elongated horizontally-disposed service platform mounted on said first and second tracks across the filter zone, said platform having means operatively associated therewith permitting said platform to travel around said annular space between said clarified gas outlet means and said shell.

2. Filter means in accordance with claim 1 wherein each of the upper and lower plates is frusto-conical with the apex of the frustrum disposed below the base.

3. Filter means in accordance with claim 1 wherein a cleanout valve is located in the center of the lower plate adapted to provide communication between one side of the bags forming a clarified gas side of the filter zone and the solids-collecting zone.

4. Filter means in accordance with claim 1 wherein the clarified gas outlet means is a tube having an open lower end and leading from a point just above the upper surface of the lower plate through the upper plate and thence through the top closure of the shell and disposed on the vertical central axis of said shell.

5. Filter means in accordance with claim 1 wherein the solids discharge means is a continuously open orifice.

6. Filter means in accordance with claim 1 wherein the chamber is supported by a tubular skirt of diameter sufficient to receive the lower end of the cone portion of the shell.

7. Filter means in accordance with claim 1 which includes a plurality of parallel-connected filters; a solids-laden gas inlet manifold connected in parallel to the means for introducing solids-laden gas to the deceleration zone; a solids-laden gas withdrawal line connected to said inlet manifold and adapted to withdraw a predetermined, small amount of solids-laden gas from said inlet manifold; a solids transport manifold connected in parallel to the means for discharging separated solids from the solids-collecting zone and connected to said gas withdrawal line to receive gas-laden solids passing therethrough; said means for discharging separated solids from said solids-collecting zone being adapted to discharge separated solids into said transport manifold and to continuously pass a portion of solids-laden gas from the solids-laden gas side of the filter bags of said filter zone to said transport manifold.

8. Filter means in accordance with claim 1 which includes a plurality of parallel-connected filters; at least one clarified gas manifold connected in parallel to the means for discharging clarified gas from the clarified gas side of the filter bags of said filter zone; a repressure gas line connected to said clarified gas manifold, passing adjacent each of said filters and then back to said clarified gas manifold; repressure valve means in said repressure gas line which is at least partially open at all times; a branch line leading from said repressure line to the clarified gas side of the filter bags of each of the filter zones and blower means mounted in said repressure line and adapted to circulate gas from said clarified gas manifold, through said repressure line and back to said clarified gas manifold and alternately to the clarified gas side of preselected ones of the filter bags of said filter zones for reverse flow through said filter bags.

9. Filter means in accordance with claim 1 which includes a plurality of parallel-connected filters; a solids-laden gas inlet manifold connected in parallel to the means for introducing solids-laden gas to a deceleration zone; a solids-laden gas withdrawal line connected to said inlet manifold and adapted to withdraw a predetermined, small amount of solids-laden gas from said inlet manifold; a solids transport manifold connected in parallel to the means for discharging separated solids from the solids-collecting zone and connected to said gas withdrawal line to receive said gas-laden solids passing therethrough; said means for discharging separated solids from said solids-collecting zone being adapted to discharge separated solids into said transport manifold and to continuously pass a portion of solids-laden gas from the solids-laden gas side of the filter bags of said filter zone to said transport manifold; at least one clarified gas manifold connected in parallel to the means for discharging clarified gas from the clarified gas side of the filter bags of said filter zone; a repressure gas line connected to said clarified gas manifold, passing adjacent each of said filters and then back to said clarified gas manifold; repressure valve means in said repressure gas line which is at least partially open at all times; a branch line leading from said repressure line to the clarified gas side of the filter bags of each of the filter zones; and blower means mounted in said repressure line and adapted to circulate gas from said clarified gas manifold, through said repressure line and back to said clarified gas manifold and alternately to the clarified gas side of the filter bags of preselected ones of said filter zones for reverse flow through said filter bags.

10. A repressure system for a plurality of parallel-connected, bag-type filters, having a solids-laden gas inlet means, a clarified gas outlet means and a separated solids outlet means in each of said filters; comprising, at least one clarified gas manifold connected in parallel to said clarified gas outlet means; a repressure gas line connected to said clarified gas manifold, passing adjacent each of said filters and then back to said clarified gas manifold; repressure valve means in said repressure gas line which is at least partially open at all times; a branch line leading from said repressure line to the clarified gas side of said filters; and blower means mounted in said repressure line and adapted to circulate gas from said clarified gas manifold, through said repressure line and back to said clarified gas manifold and alternately to the clarified gas side of preselected ones of said filters for reverse flow through said filters.

11. A repressure system in accordance with claim 10 wherein each of the branch lines has mounted therein valve means adapted to pass or stop the flow of gas from the repressure gas line to the clarified gas side of the filter.

12. A repressure system in accordance with claim 11 wherein the repressure valve means is mounted in the repressure gas line between the last of the branch lines and the entrance to the clarified gas manifold and is adapted to at least partially reduce the flow of gas from the repressure gas line back to the manifold when the valve means in one of said branch lines is opened.

13. A repressure system in accordance with claim 10 wherein the clarified gas manifold increases in diameter to accommodate the gas added thereto by additional filters.

14. Apparatus in accordance with claim 10 wherein the filters are arranged in at least two parallel rows and a separate clarified gas manifold is provided for each row.

15. A repressure system in accordance with claim 14 wherein the clarified gas manifolds are connected to a common discharge stack.

16. A filter system having a plurality of parallel-connected, bag-type filters and a solids-laden gas inlet means, a clarified gas outlet means and a separated solids outlet means in each of said filters; comprising, a solids-laden gas inlet manifold connected in parallel to said gas inlet means and adapted to supply solids-laden gas to said gas inlet means; a solids-laden gas withdrawal line connected to said inlet manifold and adapted to withdraw a predetermined, small amount of solids-laden gas from said inlet manifold; a solids transport manifold connected in parallel to said filters and connected to said gas withdrawal line to receive said gas-laden solids passing therethrough; said separated solids outlet means being adapted to discharge separated solids into said transport manifold and to continuously pass a portion of solids-laden gas from the solids-laden gas side of said filters to said transport manifold; at least one clarified gas manifold connected in parallel to said clarified gas outlet means; a repressure gas line connected to said clarified gas manifold, passing adjacent each of said filters and then back to said clarified gas manifold; repressure valve means in said repressure gas line which is at least partially open at all times; a branch line leading from said repressure line to the clarified gas side of each of said filters; and blower means mounted in said repressure gas line and adapted to circulate gas from said clarified gas manifold, through said repressure line and back to said clarified gas manifold and alternately to the clarified gas side of preselected ones of said filters for reverse flow through said filters.

References Cited

UNITED STATES PATENTS

| | | | |
|---|---|---|---|
| 1,454,248 | 5/1923 | Marx | 55—287 |
| 1,480,399 | 1/1924 | Kling et al. | 55—288 |
| 2,755,885 | 7/1956 | Smith | 55—287 X |
| 3,388,534 | 6/1968 | Jensen | 55—302 |
| 1,944,268 | 1/1934 | Rathbun | 55—341 X |
| 2,515,894 | 7/1950 | Polk | 55—344 |
| 2,717,658 | 9/1955 | Bethea et al. | 55—344 X |
| 2,781,104 | 2/1957 | Fischer | 55—304 X |
| 2,836,256 | 5/1958 | Caskey | 55—349 X |
| 2,854,092 | 9/1958 | Gustavsson | 55—349 |
| 2,911,065 | 11/1959 | Yellott et al. | 55—344 X |
| 3,146,080 | 8/1964 | Roble et al. | 55—96 |
| 3,158,455 | 11/1964 | Lincoln | 55—341 X |
| 3,177,636 | 4/1965 | Jensen | 55—341 |
| 3,246,453 | 4/1966 | Becker | 55—418 X |
| 3,264,806 | 8/1966 | Neumann | 55—346 |

FOREIGN PATENTS

| | | |
|---|---|---|
| 115,236 | 5/1942 | Australia. |
| 606,956 | 12/1934 | Germany. |
| 610,047 | 3/1935 | Germany. |
| 428,191 | 5/1935 | Great Britain. |
| 618,685 | 2/1949 | Great Britain. |
| 1,003,426 | 9/1965 | Great Britain. |

OTHER REFERENCES

ASH Top Inlet Bag House Dust Collectors, Bulletin BH–10, ASH Industries, Inc. P.O. Box 635, Paoli, Pa., Received May 4, 1966.

Chemical Engineering, McGraw Hill Inc., New York, N.Y., vol. 72, No. 14, July 5, 1965.

HARRY B. THORNTON, Primary Examiner

DENNIS B. TALBERT, JR., Assistant Examiner

U.S. Cl. X.R.

55—302, 315, 358, 341, 350, 410, 418, 431; 210—308, 333; 302—59, 27

UNITED STATES PATENT OFFICE
CERTIFICATE OF CORRECTION

Patent No. 3,491,518            Dated January 27, 1970

Inventor(s) David C. Williams

It is certified that error appears in the above-identified patent and that said Letters Patent are hereby corrected as shown below:

Column 4, line 22. "114" should read --14--.

Column 6, line 44. "the" should read --to--.

Column 7, line 16. "Transport was" should read --Transport gas--.

Column 7, line 47. "output" should read --outlet--.

SIGNED AND SEALED
OCT 6 - 1970

(SEAL)
Attest:

Edward M. Fletcher, Jr.
Attesting Officer

WILLIAM E. SCHUYLER, JR.
Commissioner of Patents